Figure 2:
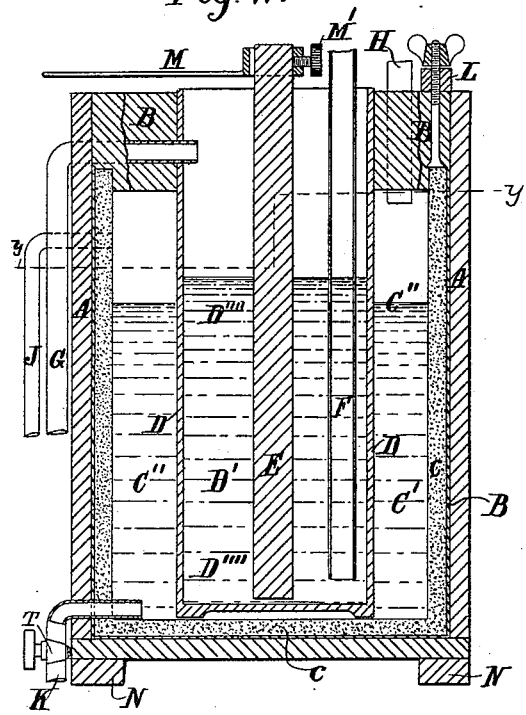

(No Model.) 2 Sheets—Sheet 1.

S. MILLER.
GALVANIC BATTERY.

No. 466,177. Patented Dec. 29, 1891.

(No Model.) 2 Sheets—Sheet 2.
S. MILLER.
GALVANIC BATTERY.
No. 466,177. Patented Dec. 29, 1891.
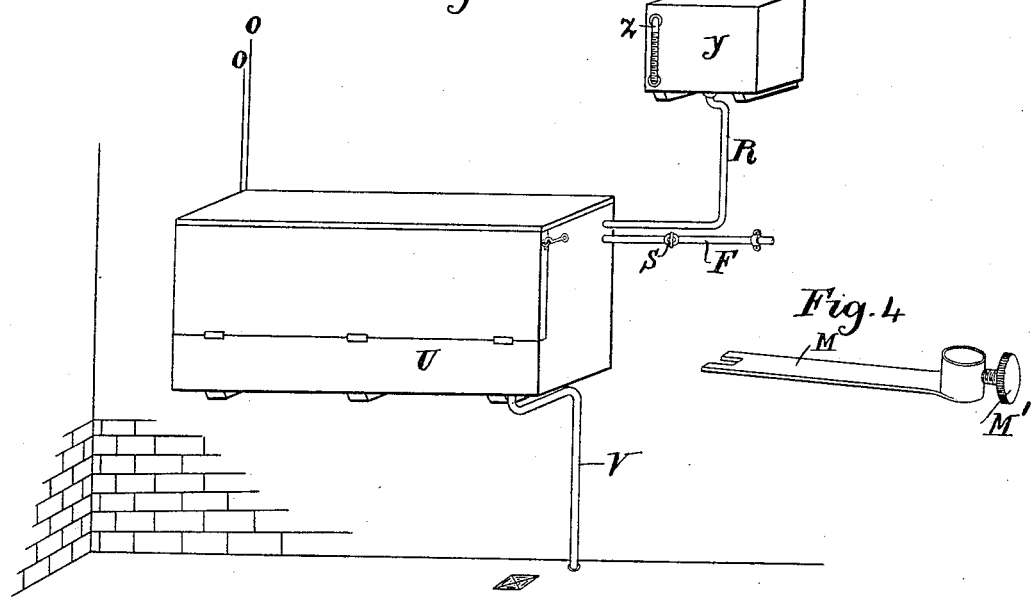

UNITED STATES PATENT OFFICE.

SAMUEL MILLER, OF BUXTON, ENGLAND, ASSIGNOR TO EVELYN GLOVER, OF SAME PLACE.

GALVANIC BATTERY.

SPECIFICATION forming part of Letters Patent No. 466,177, dated December 29, 1891.

Application filed October 16, 1891. Serial No. 408,938. (No model.) Patented in England October 5, 1888, No. 14,322; in France September 30, 1889, No. 201,018, and in Austria-Hungary September 19, 1890, No. 16,200 and No. 36,246.

*To all whom it may concern:*

Be it known that I, SAMUEL MILLER, engineer, a subject of the Queen of Great Britain and Ireland, residing at 1 Langton Cottages, Melbourne Square, Buxton, in the county of Surrey, England, have invented an Improved Galvanic Cell or Battery for Electric Lighting or for other Purposes, (for which I have obtained patents in Great Britain, No. 14,322, dated October 5, 1888; in France, No. 201,018, dated September 30, 1889, and in Austria-Hungary, No. 16,200 and No. 36,246, dated September 19, 1890,) of which the following is a specification.

This invention has for its object to provide a primary galvanic battery or cell which is convenient in use and economical and very efficient in action. Within a casing of wood or other equivalent material is embedded in pitch or such like substance a cylinder or box of carbon, constituting one electrode of the battery. This carbon cylinder or box is preferably corrugated on the inside—viz., on that side which is exposed to the opposite electrode or zinc. Within the said carbon cylinder or box is placed a porous pot, which is divided throughout its entire length by a porous partition into two chambers or compartments, one considerably larger than the other. Into the larger compartment water is introduced, and in it the zinc electrode is placed, and in the smaller one is placed a supply of acid, such as sulphuric acid or hydrochloric acid or a mixture thereof. The partition between the two compartments, being porous, allows a sufficient quantity of the acid to leak through from the smaller compartment into the water which is contained in the larger compartment, and thus the water in that larger compartment becomes acidulated. The space outside the porous pot contained by the carbon cylinder or chamber is filled with a depolarizing solution, hereinafter referred to. Both these chambers or compartments here referred to may be provided with supply-pipes and overflow-pipes in order to facilitate the supply and discharge of the necessary liquids to their respective chambers. The connections from the zinc element of the one cell to the carbon element of the adjoining cell is by preference made by means of a platinized clip, one end of which is connected to the top of the zinc by a screw or equivalent arrangement, the other end being preferably formed with small arms, which may be connected to the carbon chamber by a screw attachment or spring-clip. This clip or attachment should be platinized to prevent corrosion. Such a clip allows of the easy renewal of the zincs. The depolarizing fluid or solution before referred to, which is placed within the carbon chamber and surrounds the porous pot, is composed of or contains nitrate of soda, bichromate of potash, chloride of sodium, and sulphuric or hydrochloric acid, (or both such acids.) In one quart of cold water I dissolve half a pound of nitrate of soda and two ounces of bichromate of potash, and to this solution I add fifteen fluid ounces of sulphuric acid or hydrochloric acid or a mixture of such acids, it being added slowly so as to generate as little heat as possible. When this solution is quite cold, I add two ounces of chloride of sodium. I also find that it can be very satisfactorily prepared in the following way: To one quart of cold water I add, gradually, one pint of sulphuric acid or hydrochloric acid or a mixture of the two acids, and I allow the solution to cool, preferably, to 75° Fahrenheit. I then add six ounces of finely-powdered nitrate of soda and one and a half ounces of finely-powdered bichromate of potash. The mixture is then thoroughly stirred until the solids are dissolved, and then one ounce of chloride of sodium is added. The whole may then be finally stirred. The ingredients named may be those which are procurable as commercial products. The foregoing solution is more especially suitable for the larger class of batteries. If the batteries be of the smaller kind, such as for miners' lamps, it is preferred to use four ounces each of the nitrate of soda and the bichromate of potash. It will be seen from the foregoing directions that the proportions used may be varied somewhat to suit different cases; but any of the above proportions will enable the good results of my invention to be obtained, although the proportions which in any individual case will produce the maximum efficiency will not be the same in all cases. When a battery of several of these cells is used, each cell is preferably supplied with the liquids or solutions by pipes and taps arranged as follows: The pipes supplying the depolarizing solution to the carbon cylinder or chamber enters at or toward the top of the chamber, and is a branch from a main pipe, such branch pipe having a stop-cock. An overflow-pipe is arranged from nearly the top of the carbon chamber in case the cock should be left open. A pipe is also arranged with a stop-cock from the bottom of the chamber to empty the same when required. The top of this chamber is by preference inclosed up to the porous pot with pitch or such like substance. The vat or cistern in which the depolarizing solution is stored can be fitted with a glass gage divided up into given spaces, each space registering that quantity which is allowed to sufficiently fill the carbon chamber of each cell with the depolarizing solution, and the said vat or cistern is placed at a higher level than the top of the cell or cells it is to supply. When it is required to fill the carbon cylinder or chamber, the stop-cock in the branch pipe is opened, and when the glass gage registers one space of liquid less in the vat the stop-cock is closed. The water for the larger chamber of the porous pot can be supplied by a branch pipe to each porous pot connected to a main pipe, in which is fixed a stop-cock. These branch pipes extend to within a short space of the bottom of the porous pots. Each porous pot is supplied with an overflow-pipe a short distance below its top. The overflow-pipes from both the porous pot and the carbon chamber discharge into a trough beneath the cells, from which a discharge-pipe is arranged. The supply-pipe to the porous pot terminates near the bottom of the pot, so as to facilitate the washing out of the same by the supply of water. The smaller compartment of the porous pot can be most conveniently supplied with its acid, before referred to, by hand. If the porous pot be not divided into two compartments, the acid solution can be poured in by hand, or pipes, as at F, can be used for the purpose. The cell or battery is incased in a box of wood or other suitable material and is supported upon bearers, sufficient space being allowed below the cell or battery to form a trough into which the discharge-pipes, before mentioned, enter, and from such trough a waste-pipe is taken to carry off the liquids. The casing may be provided with a hinged flap or top for examining the cells, and the leads for connection are carried off through this casing in any convenient position. It is not necessary in the case of cells of a small size to have the porous pot divided into two compartments. If it consists of but one compartment, it will contain the zinc element and acidulated water will be placed in it.

In order that my invention may be well understood, I will now proceed to describe the several figures of the drawings hereunto annexed, all of which figures are marked and numbered with the like letters of reference throughout.

Figure 1:
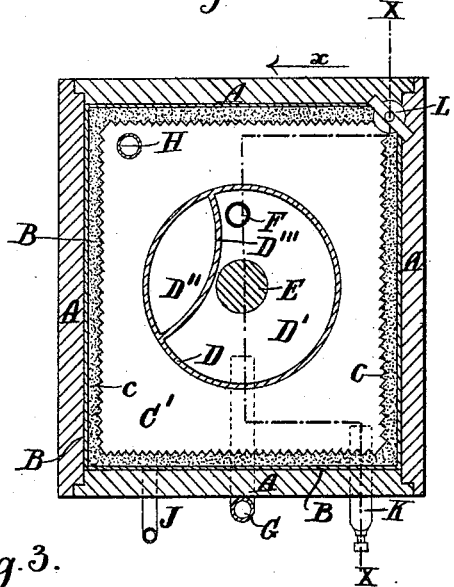
Figure 3:
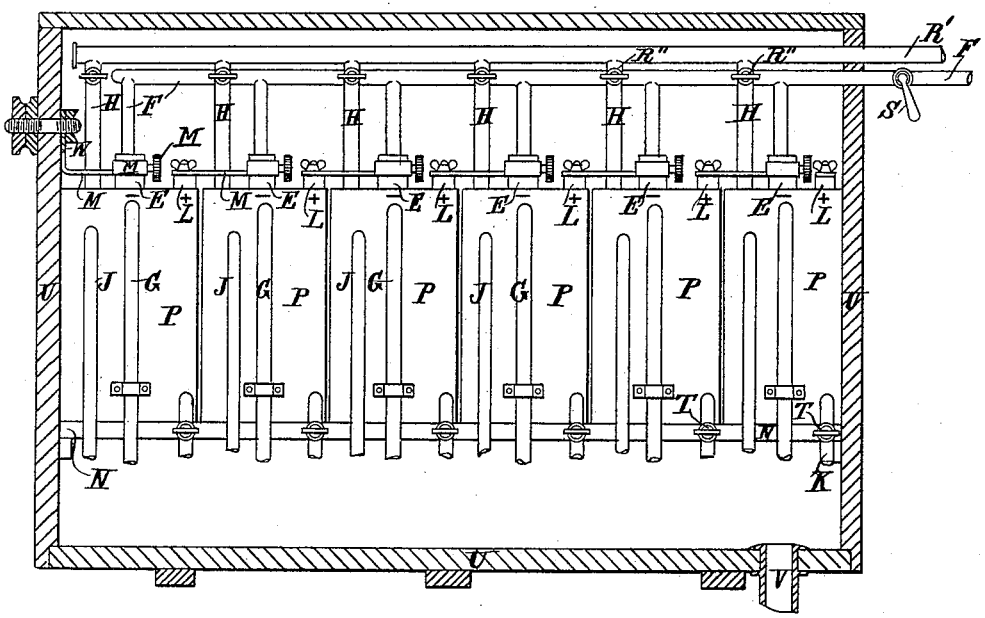

Figure 1 is a horizontal section on line $y\ y$ of a single cell, made according to my said invention. Fig. 2 is a vertical section taken on the line $x\ x$ of Fig. 1, looking in the direction of the arrow $x$. Fig. 3 shows a battery with the various connections and supply devices or arrangements. Fig. 4 shows the clip in perspective. Fig. 5 shows the arrangement of the vat or cistern for the depolarizing solution in connection with the battery.

A is the casing, in which the carbon cylinder or chamber $c$ is placed, and B is the pitch or similar substance, in which the carbon chamber is embedded and by which its top is inclosed. The carbon cylinder or chamber C has its inside corrugated, as before mentioned.

C' is the space, in which the depolarizing fluid or solution is placed, and D is the porous pot, in this instance shown as being divided into the two chambers, D' being the large chamber and D'' the smaller compartment, to be supplied with sulphuric or hydrochloric acid, or both.

D''' is the porous partition, allowing the acid in the one chamber to pass through into the water in the larger chamber.

E is the zinc placed in the larger chamber of the porous pot.

F is the pipe supplying the water to the chamber D'.

G shows the overflow-pipe from the chamber D'.

H is the branch pipe to supply the depolarizing solution to the space C' contained by the carbon chamber.

J is the overflow-pipe from the carbon chamber.

K shows the pipe with stop-cock for emptying the carbon chamber when desired.

L is the attachment to the carbon chamber, to which the platinized clip from the zinc of the adjoining cell is secured.

M is the platinized clip forming the connection from the positive to the negative terminals of the respective cells. This clip is formed at the one end with a hoop or ring to fit over the zinc, to which it is fixed by a small screw M'. The other end is formed with a forked end, which is attached to the screw L in connection with the carbon of the adjoining cell.

N N are the bearers to carry the cells.

C'' indicates the depolarizing-fluid, and D'''' indicates the water in the porous pot.

P P P P P P in Fig. 3 indicate the cells, + indicates the positive terminals, and − indicates the negative terminals.

R' is the main pipe from the vat or cistern to the branch pipes H, supplying the depolarizing liquid or solution, and R″ R″ are the stop-cocks in the branch pipes H.

S is the stop-cock in the main pipe F, which supplies water to the larger chambers of the porous pots.

T is the stop-cock in the pipe K, which is used to empty the carbon chamber of its depolarizing liquid or solution.

U shows in section the box or casing inclosing the cells.

V is the waste-pipe from the trough under the cells.

W shows one of the end terminals.

y, Fig. 5, shows the vat or cistern containing the depolarizing fluid or solution fixed on bearers above the level of the cells, and z is the gage marked to indicate the quantity of liquid contained in the vat or cistern and the difference in level due to the withdrawal of each charge.

O O show the leads from the respective terminals.

In small cells the division D‴ may be dispensed with, in which case acidulated water is put into the simple porous pot.

I am aware that the form of carbon chamber which I have here described and drawn has already been in use, and I do not claim this form of carbon cylinder or chamber; but I preferably use this internally-corrugated carbon cylinder or chamber, though it is not essential to my invention. As my said improvements are capable of various modifications without departing from the principle thereof, I do not restrict myself to the precise details hereinbefore described.

The depolarizing-liquid herein described is specifically claimed in my application of even date, Serial No. 408,937.

Having now fully described my said invention, what I claim is—

1. A primary battery comprising in combination the following elements: a case or vessel, a carbon element in the form of a cylinder or box embedded in pitch or similar substance and containing the depolarizing-liquid, a porous pot inclosed by the carbon box and containing an acid solution, and a zinc element in said porous pot, substantially as described.

2. A primary battery comprising in combination a case or vessel, a carbon element therein in the form of a box embedded in pitch or like substance, a depolarizing solution in the carbon box, a porous pot divided by a porous partition into unequal compartments, the larger for water and the smaller for acid, and a zinc element in the larger compartment, substantially as described.

In testimony whereof I have signed my name to this specification in the presence of two subscribing witnesses.

SAMUEL MILLER.

Witnesses:
   CHAS. MILLS,
   ARTHUR J. NASH,
*Both of 47 Lincoln's Inn Fields, London, W. C.*